United States Patent
McGowan

(10) Patent No.: US 7,908,421 B2
(45) Date of Patent: Mar. 15, 2011

(54) UNIVERSAL SERIAL BUS ENDPOINT CONTEXT CACHING

(75) Inventor: Steven B. McGowan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 150 days.

(21) Appl. No.: 12/241,648

(22) Filed: Sep. 30, 2008

(65) Prior Publication Data

US 2010/0082862 A1  Apr. 1, 2010

(51) Int. Cl.
- *G06F 13/20* (2006.01)
- *G06F 3/00* (2006.01)
- *G06F 5/00* (2006.01)
- *G06F 9/46* (2006.01)

(52) U.S. Cl. .............. 710/313; 710/20; 710/21; 710/58; 718/102

(58) Field of Classification Search ......... 710/20, 710/21, 58, 313; 718/102
See application file for complete search history.

(56) References Cited

U.S. PATENT DOCUMENTS

| | | | | |
|---|---|---|---|---|
| 6,145,045 A * | 11/2000 | Falik et al. | | 710/310 |
| 6,185,641 B1 * | 2/2001 | Dunnihoo | | 710/56 |
| 6,205,501 B1 * | 3/2001 | Brief et al. | | 710/100 |
| 6,266,715 B1 * | 7/2001 | Loyer et al. | | 710/22 |
| 6,353,866 B1 * | 3/2002 | Fensore et al. | | 710/104 |
| 6,523,081 B1 * | 2/2003 | Karlsson et al. | | 710/305 |
| 6,678,760 B2 * | 1/2004 | Brief | | 710/52 |
| 6,721,332 B1 * | 4/2004 | McAlear | | 370/466 |
| 6,804,243 B1 * | 10/2004 | Humphrey et al. | | 370/395.1 |
| 6,816,929 B2 * | 11/2004 | Ueda | | 710/56 |
| 6,862,643 B2 * | 3/2005 | Wu et al. | | 710/302 |
| 7,000,035 B1 * | 2/2006 | Uchizono et al. | | 710/2 |
| 7,222,201 B2 * | 5/2007 | Augustin et al. | | 710/105 |
| 7,272,676 B2 * | 9/2007 | Saito et al. | | 710/52 |
| 7,506,084 B2 * | 3/2009 | Moerti et al. | | 710/52 |
| 7,526,594 B2 * | 4/2009 | Tseng et al. | | 710/310 |
| 7,657,684 B2 * | 2/2010 | Guo et al. | | 710/268 |
| 2005/0273541 A1 * | 12/2005 | Hayenga et al. | | 710/305 |
| 2006/0026333 A1 * | 2/2006 | Parr et al. | | 710/313 |
| 2007/0174533 A1 * | 7/2007 | Tseng et al. | | 710/313 |
| 2007/0214276 A1 * | 9/2007 | Panabaker et al. | | 709/230 |

FOREIGN PATENT DOCUMENTS

EP  1102173 A2 *  5/2001

(Continued)

OTHER PUBLICATIONS

Jolfaei et al., "High Speed USB 2.0 Interface for FPGA Based Embedded Systems," Dec. 10-12, 2009, Embedded and Multimedia Computing, 2009. EM-Com 2009. 4th International Conference on, pp. 1-6.*

(Continued)

*Primary Examiner* — Faisal M Zaman
(74) *Attorney, Agent, or Firm* — Buckley, Maschoff & Talwalkar LLC

(57) ABSTRACT

According to some embodiments, an apparatus may be capable of exchanging information with t potential universal serial bus endpoints, where t is an integer greater than 1. Moreover, x endpoint state machines may be established, where x is an integer greater than 1 and less than t. A first endpoint state machine may then be assigned to a first potential endpoint having a pending work item. Before the apparatus has completed the pending work item associated with the first potential endpoint, the first endpoint state machine may be flushed, and the first endpoint state machine may be re-assigned to a second potential endpoint.

11 Claims, 4 Drawing Sheets

FOREIGN PATENT DOCUMENTS

| | | | | |
|---|---|---|---|---|
| JP | 2002300228 | A | * | 10/2002 |
| JP | 2004362544 | A | * | 12/2004 |
| JP | 2006065859 | A | * | 3/2006 |
| JP | 2009093418 | A | * | 4/2009 |
| WO | WO 9963448 | A1 | * | 12/1999 |

OTHER PUBLICATIONS

Foster et al., "Sub-nanosecond Distributed Synchronisation via the Universal Serial Bus," Oct. 1-3, 2007, Precision Clock Synchronization for Measurement, Control and Communication, 2007. ISPCS 2007. IEEE International Symposium on , pp. 44-49.*

Tual et al., "USB full speed enabled smart cards for consumer electronics applications," Jun. 14-16, 2005, Consumer Electronics, 2005. (ISCE 2005). Proceedings of the Ninth International Symposium on , pp. 230-236.*

Li et al., "A high-speed data acquisition system based on FPGA," Test and Measurement, Dec. 5-6, 2009, ICTM '09, International Conference on , vol. 1, pp. 290-293.*

* cited by examiner

UNIVERSAL SERIAL BUS ENDPOINT CONTEXT CACHING

BACKGROUND

In some cases, an apparatus may exchange information with one or more peripheral devices. For example, a personal computer may be able to communicate with printers, keyboards, and video cameras via a Universal Serial Bus (USB) interface. Moreover, each device might be associated with a number of different endpoints. For example, a personal computer might receive an indication movement from one endpoint of a USB computer mouse and an indication of a computer mouse click from another endpoint of that device. Note that the USB interface lets devices be added to (and removed from) the apparatus as desired by a user. As a result, the actual number of attached devices and/or active endpoints being used are not known when the apparatus is being designed.

One approach to designing such an apparatus is to provide support for a maximum number of attached devices and/or associated endpoints that will be permitted. For example, if up to thirty two devices are allowed to be connected to the apparatus, and each device is allowed to have thirty two endpoints exchange information with the apparatus, support for up to a total of 1,024 endpoints would be provided (e.g., buffers, registers, and other associated hardware may be provided such that 1,024 endpoints can be simultaneously supported by the apparatus). Such an approach, however, can be inefficient, especially if the number of devices and/or endpoints that are typically used is substantially less than the maximum number.

DETAILED DESCRIPTION

Figure 1:
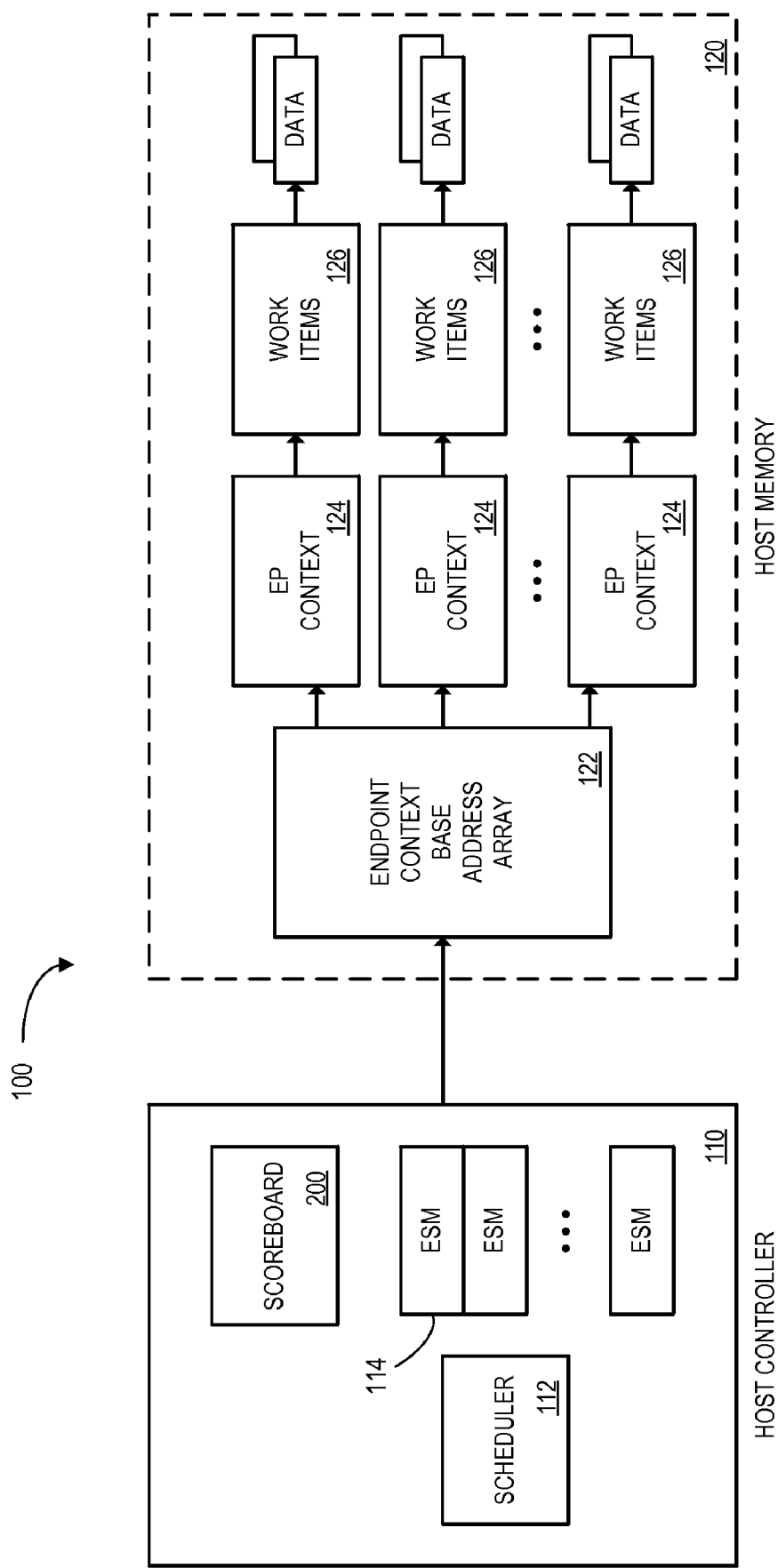
FIG. 1 is a block diagram of a system according to some embodiments.

FIG. 1 is a block diagram of a system 100 according to some embodiments. The system 100 may be associated with, for example, an apparatus or device that is adapted to communicate with a plurality of peripheral devices in accordance with a Universal Serial Bus (USB) interface standard. For example, the system 100 might include a host controller 110 and a host memory 120 to support communication with printers, keyboards, video cameras, and other devices via USB interfaces. Moreover, each USB device might be associated with a number of different endpoints (e.g., a source or sink of data associated with the device).

Note that the USB interface lets devices be added to (and removed from) the system 100 as desired by a user. As a result, the actual number of attached devices and/or active endpoints being used will not be known when the system 100 is being designed. One approach to designing the system 100 is therefore to provide support for a maximum number of attached devices and/or associated endpoints. For example, if up to thirty two USB devices are allowed to be connected to the system 100, and each USB device is allowed to have thirty two endpoints exchange information with the system 100, support for up to a total of 1,024 endpoints could be provided (e.g., buffers, registers, and other associated hardware may be provided such that 1,024 endpoints can be simultaneously supported by the system 100). Such an approach, however, can be inefficient, especially if the number of devices and/or endpoints that are typically used is substantially less than the maximum number.

According to some embodiments, an internal host controller 110 architecture may be provide to reduce hardware requirements along with an algorithm to schedule those limited resources across USB endpoints supported by the system 100. For example, the host controller 110 may include a number of Endpoint State Machines (ESMs) 114. Each endpoint state machine 114 may, for example, manage data transfers associated with an endpoint. The endpoint state machine 114 might include a set of registers that define an address of a USB device and the target endpoint, as well as registers that define work items 126 that may be pending in the host memory 120. The work items 126 may comprise, for example, data structures that define data buffers in the host memory 120, which may receive IN data or be the source of OUT data (e.g., to an external USB device). According to some embodiments, the endpoint state machines 114 may be capable of managing scatter/gather operations and/or concatenating separate data buffers referenced by multiple work items 126 into contiguous USB data.

To help manage the endpoint state machines 114, the host controller 100 may include a scheduler 112 and a scoreboard 200 (one example of which is described in connection with FIG. 2 herein). As will be explained, the scheduler 112 may determine when work items 126 associated with an endpoint will be scheduled to be exchanged via the USB interface.

The scoreboard 200 may comprise a two-dimensional array of scoreboard entries that reside in host controller 110 hardware. One dimension of they array may be indexed by a device identifier and the other dimension may be indexed by an endpoint identifier. Consider, for example, FIG. 2 which illustrates the scoreboard 200 according to some embodiments. In this case, the scoreboard 200 is indexed in a first dimension 210 to support n+1 devices (0 through n).

Figure 2:
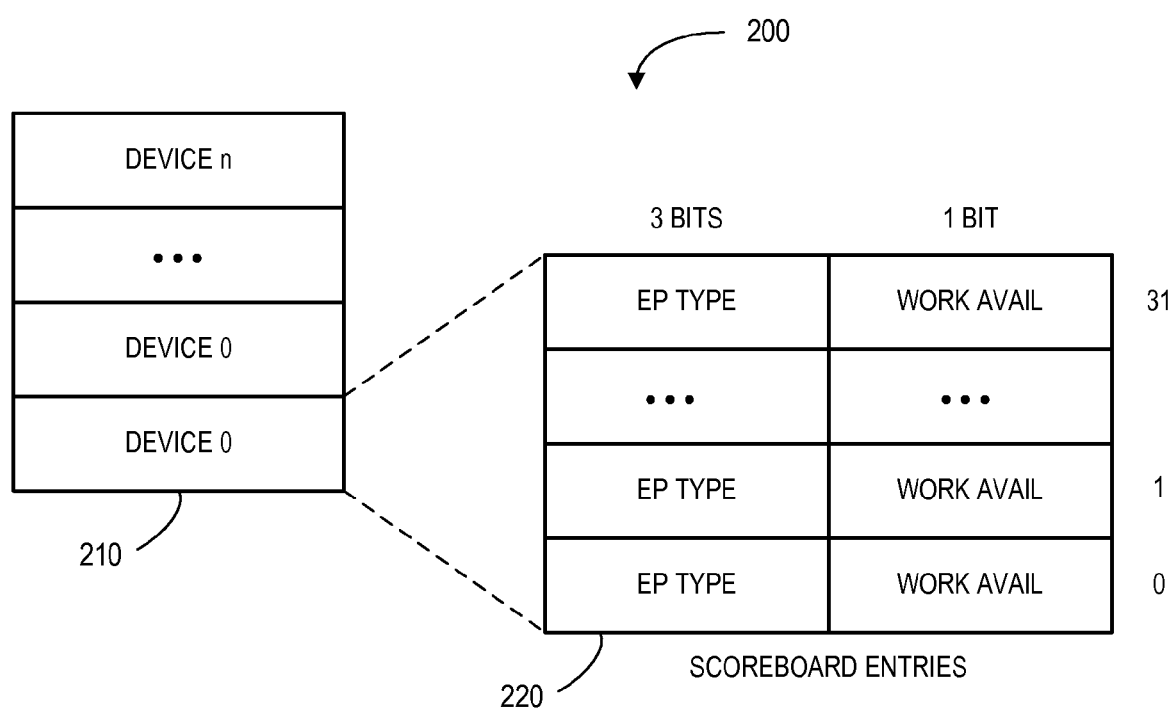
FIG. 2 illustrates a scoreboard according to some embodiments.

The scoreboard 200 is further indexed in a second dimension 220 to support thirty two endpoints for each device (the endpoints being associated with identifiers 0 through 31 in FIG. 2). According to some embodiments, a five-bit endpoint identifier may be defined as including four bits indicating a USB endpoint number and one bit indicating an endpoint direction. Note that the direction bit might be set to "1" for bidirectional endpoints, such as control endpoints.

Each entry in the scoreboard 200 might include two fields: (i) an endpoint type that identifies the endpoint type (and whether or not it is enabled), and (ii) a work available flag that indicates whether the endpoint has any pending work items 126 in the host memory 120. For example, an implementation that supported 24 USB devices might contain an endpoint scoreboard 200 with 768 entries (representing 24 devices multiplied by 32 endpoints for each device). According to some embodiments, the work available flag of an endpoint may be set by system software when a work item 126 is added, and be is cleared by an endpoint state machine 114 when it completes the last work item 126 for that endpoint. Further note that a host controller 110 doorbell mechanism may be used by software to set the work available flag.

Referring again to FIG. 1, the host memory 120 may include an endpoint context base address array 122 representing array of pointers indexed by USB device identifier. Each entry in the endpoint context base address array 122 may, for example, point to one of 32 Endpoint (EP) context 124 data structures associated with the respective device. That is, each USB device may define an endpoint context 124 data structure in the host memory 120 for each enabled endpoint. These data structures may be initialized by software to define the characteristics of an endpoint (e.g., addressing and work item 1276 information).

Consider now, be way of example, a USB device X that declares three endpoints: Control (EP0), Interrupt (EP1 IN), and Isoch (EP2 OUT). When the USB device is enumerated for the system 100, the scoreboard 200 entries for device X may be initialized. As a result, the endpoint type field in the scoreboard 200 for endpoints 0, 1 IN, and 2 OUT are initialized with the respective type (Control, Interrupt, Isochronous, or Bulk and Bidirectional, IN, or OUT). The remaining scoreboard 200 entries for USB device X may have their endpoint type set to "disabled." This process may be repeated for each USB device attached to the system 200.

According to some embodiments, USB transfer types are prioritized as follows: isochronous, interrupt, control, and bulk (with Isoch being the highest priority). Note that isochronous and interrupt endpoints are periodic in nature and define a minimum service interval. That is, the host controller 110 may attempt to guarantee that actions are performed at least within the minimum service interval.

The scheduler 112 may then utilize the scoreboard 200 in accordance with a multi-phase algorithm. By way of example, when a minimum service interval "phase 1" begins, the scheduler 112 may query the scoreboard 200 to determine the first isochronous endpoint with a pending work item 126 (because isochronous endpoints have been given the highest priority). An appropriate endpoint state machine 114 may then be selected, loaded with the pertinent information from the endpoint context 124, and started.

The endpoint state machine 114 will then process one endpoint work item 126 and flag itself as "available." Meanwhile, the scheduler 112 queries the scoreboard 200 for the next isochronous endpoint with a pending work items 126. After all isochronous endpoints have been processed, the scheduler 112 may enter "phase 2" by processing all interrupt endpoints in a similar fashion.

After all "periodic" endpoints (that is, isochronous and interrupt endpoints) endpoints have been serviced once, the scheduler 112 may proceed to asynchronous endpoints (that is, control and bulk endpoints). For example, "phase 3" might comprise processing control endpoints in a round-robin process until there are no work items 126 left. Phase 4 may then process bulk endpoints, following the same algorithm as the control endpoints. After the minimum service interval, the processing of asynchronous endpoints may be terminated and the scheduler 112 may restart at phase 1 (processing isochronous endpoints again). Note that in each phase, the scoreboard 200 information may be used to identify the subset of endpoints that have work items 126 pending.

Consider the case where a host controller 110 implementation supported 24 devices and 16 endpoint state machines 114. A Scoreboard 200 may be unnecessary if there are enough endpoint state machines 114 to support the worst case configuration (744 endpoints). If endpoint state machines 114 maintain approximately 36 bytes of state and each scoreboard 200 entry is only 4 bits, then the scoreboard 200 for 24 devices (744 endpoints) would require approximately 372 bytes. Note, however, that 744 endpoint state machines 114 may require 26,784 bytes.

A benefit of the scoreboard 200 may be realized when there are more active endpoints than there are endpoint state machines 114. That is, the scoreboard 200 may reduce hardware requirements by allowing the host controller 110 to implement only the number of endpoint state machines 114 needed to support a typical USB configuration, and yet still be able to support much larger configurations. This is because the scoreboard 200 keeps track of all active endpoints of all devices supported by the host controller 110.

If the scheduler 112 (upon querying the scoreboard 200) determines that an endpoint must be scheduled but all endpoint state machines 114 have already been allocated, it can flush the state of an "available" endpoint state machine 114 back to its endpoint context 124 in host memory 120, then load that endpoint state machine 114 with the endpoint context 124 of the new endpoint that requires service.

Note that one problem with typical USB host controllers is that they rely on system software built packet schedules in host memory for sending and receiving packets on the USB, and the packet schedule is periodically accessed to determine whether there are any work items to process. These periodic accesses can keep memory and processor caches alive (even when all USB devices are idle and no data is being moved). Future USB host controllers may have these schedules built in hardware to eliminate the host memory activity associated with scheduling. Such USB host controllers may also define a fixed number of device slots, and the host controller may required to provide resources for each device slot to ensure that a device attached to a slot will function properly. If the user attempts to attach more devices than there are device slots, the devices may be rejected. Some embodiments described herein may provide an efficient means of decoupling the resources needed to support a USB device from a device slot, allowing the host controller to support a larger number of device slots given similar internal resources. Moreover, embodiments may reduce host controller hardware resource requirements while achieving the intended benefits of USB architectures for expected typical configurations. When the internal resource capabilities are exceeded (e.g. due to a larger than expected number of attached devices), the host controller can begin multiplexing those internal resources, caching state in host memory.

Consider, for example, a USB interface that supports up to 127 devices attached to a single bus. Moreover, assume that typical users have less than four devices attached to their systems (including hubs) at one time, and even a heavy user might have only fifteen devices attached. The USB interface may further allow each USB device to supports up to 31 endpoints (even though an average USB device declares only approximately 3). In a worst case scenario (127 devices, each with 31 endpoints) would requires support for approximately 8,000 endpoints. In typical situations, however, a system would supported four USB devices and use internal resources to support approximately 16 active endpoints (such a system would meet the needs of most USB users). According to some embodiments described herein, a host controller may be designed to meet appropriate power and bandwidth requirements for most users, and trade off power and bandwidth for functionality to support the small minority of situations when more endpoints are needed.

Figure 3:
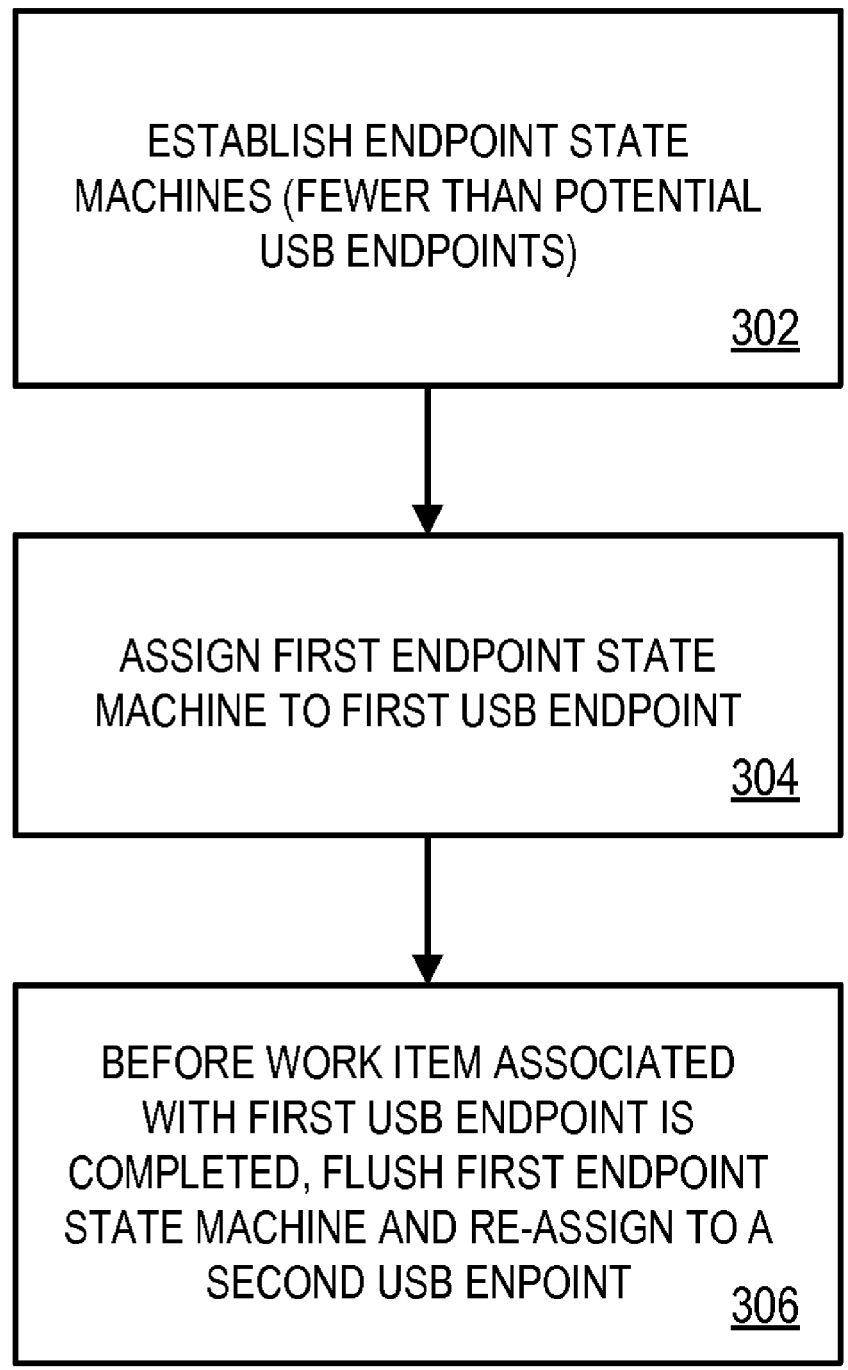
FIG. 3 is a flow chart of a method according to some embodiments.

FIG. 3 is a flow chart of a method according to some embodiments. The method may be performed, for example, the system 100 described with respect to FIG. 1. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 302, a plurality of endpoint state machines are established in connection with at an apparatus capable of exchanging information with t potential USB endpoints, where t is an integer greater than 1. For example, x endpoint state machines may be established, where x is an integer greater than 1 and less than t. Moreover, the apparatus may be capable of exchanging information with n universal serial bus devices, each device supporting up to e potential endpoints, where n and e are integers greater than 1 and n multiplied by e equals t.

At 304, a first endpoint state machine is assigned to a first USB endpoint. For example, the first endpoint state machine may be assigned to a USB endpoint having a pending work item. The pending work item might, for example, represent data to be transferred out of the apparatus or data to be transferred into the apparatus (e.g., from a peripheral device). Note that various work items might comprise periodic work items (e.g., isochronous and/or interrupt work items) and/or asynchronous work items (e.g., control and/or bulk work items).

Before the apparatus has completed the pending work item associated with the first potential endpoint, the first endpoint state machine may be flushed at 306. In addition, the first endpoint state machine may be assigned to a second potential endpoint. That is, the first endpoint state machine is re-used and multiplexed for multiple endpoints when required.

According to some embodiments, a two-dimensional endpoint scoreboard having n by e entries is maintained. For example, each entry might include (i) an indication of an endpoint type, and (ii) a work available indication. In this case, a scheduler at a host controller might assign endpoint state machines to potential endpoints having pending work items in accordance with the two-dimensional endpoint scoreboard (and, in some embodiments, a minimum service interval).

Note that each endpoint state machine might manage a single USB endpoint at any one given point in time. A host controller designer may choose an appropriate number of endpoint state machines such that, in typically USB configurations, there are more endpoint state machines than active endpoints. Moreover, data structures in host memory may define the state of each endpoint. In typical usage scenarios, the endpoint state may only be loaded into an endpoint state machine when a device is enumerated. According to some embodiments described herein, endpoint state machines may be multiplexed to handle cases where there are more active endpoints than endpoint state machines. Thus, embodiments may lower USB host controller resource requirements by scheduling a relatively small set of endpoint state machines across a relatively large set of possible endpoints. The scoreboard described may define a lowest state necessary to provide a comprehensive scheduling of USB endpoints. Further note that, as long as there are more endpoint state machines than active endpoints, the only memory activity generated by the host controller may be to fetch work items and move data. Moreover, endpoint context may only be loaded at device enumeration time.

Figure 4:
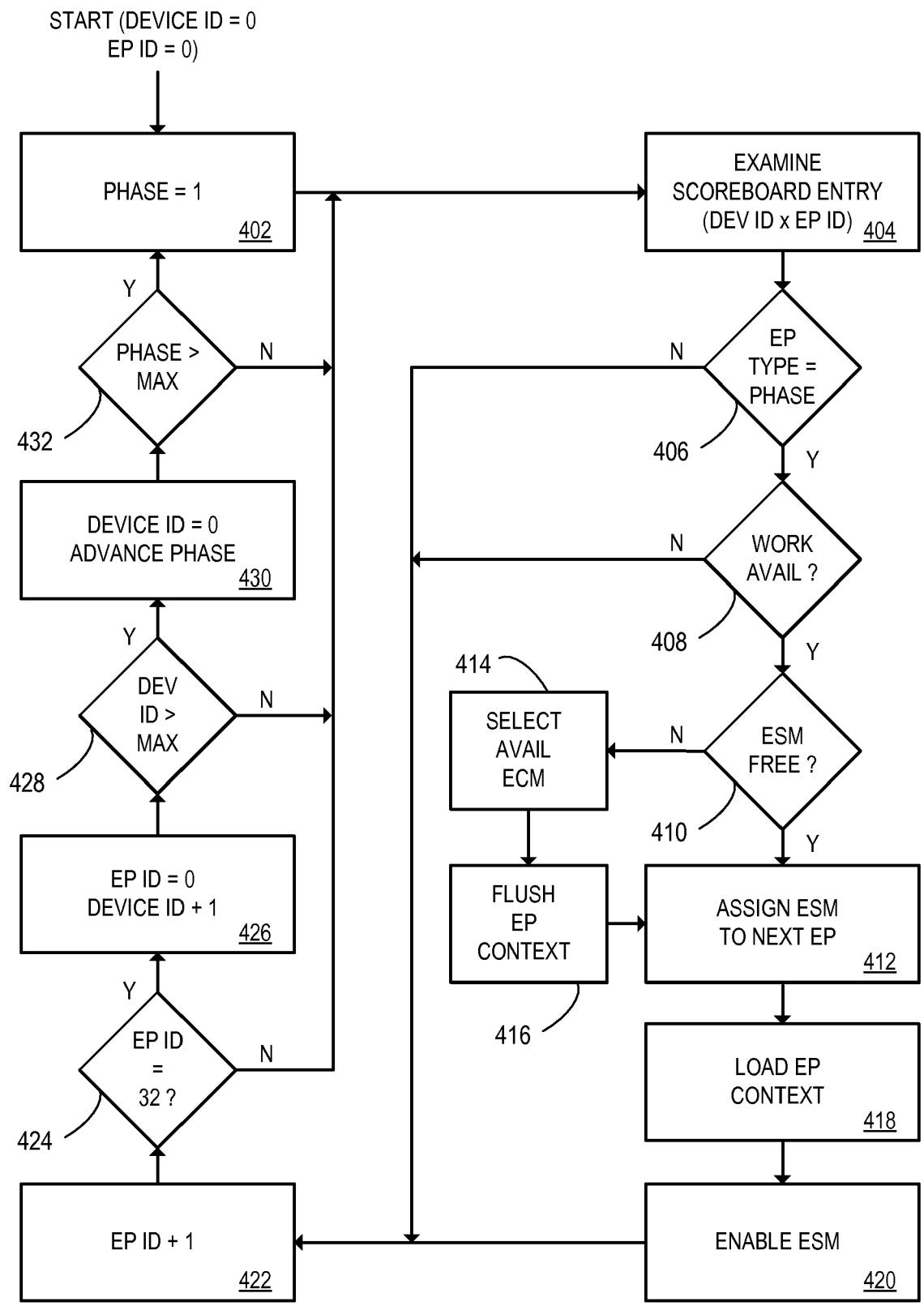
FIG. 4 is a flow chart of a method that may be associated with a scheduler algorithm according to some embodiments.

FIG. 4 is a flow chart of a scheduler method according to some embodiments of the invention. The method might be performed, for example, in connection with each phase of scheduler operation described in connection with FIG. 1. After being initialized with a device identifier of "0" and an endpoint identifier of "0," "phase 1" of the scheduler's operation may be initiated at 402. The scoreboard entry for the current device identifier and endpoint identifier is determined at 404.

If the endpoint type in the scoreboard does not match the current phase (e.g., if the endpoint type is not "isochronous" the first time through the method), the method advances to 422. Similarly, if the scoreboard indicates that the endpoint does not currently have a pending work item available at 408, the method advances to 422.

If an endpoint state machine is available at 410, it is assigned to the appropriate endpoint at 412. If no endpoint state machine is available at 410 (e.g., they are all currently assigned to other endpoints), a machine is selected at 414, the endpoint context is flushed at 416, and it is assigned at 412. The appropriate endpoint context may then be loaded at 418, and the endpoint state machine maybe enabled at 420.

At 422, the endpoint identifier may be incremented and, if it does not exceed the maximum number of endpoints per device (e.g., 32), the method may continue at 404 by examining the appropriate scoreboard entry.

If the incremented endpoint identifier exceeds the maximum number of endpoints per device at 424, it is reset to zero and the device identifier is incremented at 426. If the incremented device identifier does not exceed the maximum number of devices for the system at 428, the method may continue at 404 by examining the appropriate scoreboard entry (e.g., the first endpoint of the next device).

If the incremented device identifier exceeds the maximum number of devices at 428, it is reset to zero and the phase is incremented at 430. If all phases have completed at 432, the method repeats again with the first phase at 402. If all phases have not been completed at 432, the scoreboard is examined at 404 for the new phase.

In this way, the scheduler may support the definition of endpoint hardware resources that are independent of the number of USB devices supported by the interface. A designer may define an interface that supports a worst case number of USB devices that they expect to be attached to the system, while only defining the endpoint resources for the typical number of devices that they expect to be attached. The scheduling algorithms described herein may manage a relatively small number of endpoint resources across a relatively large number of devices. Such an approach may let a system be created for typical usage cases (reducing power, memory, and bandwidth requirements) while still supporting more difficult case configurations (at the cost of consuming additional power and memory bandwidth).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Although particular system, hardware, and interface configurations have been described herein, note that embodiments may be performed with any other types of system, hardware, and/or interface configurations. Similarly, although specific methods have been described, any number of other types of methods might be performed in connection with embodiments described here. For example, instead of a four phase method to assign endpoint state machines in accordance with scoreboard information, a two phase method might be employed instead (e.g., the first phase might handle periodic endpoints while the second phase handles asynchronous endpoints).

The several embodiments described herein are solely for the purpose of illustration. Persons skilled in the art will recognize from this description other embodiments may be practiced with modifications and alterations limited only by the claims.

What is claimed is:

1. A method, comprising:
at a universal serial bus host controller capable of exchanging information with n universal serial bus devices, each device supporting up to e potential endpoints, where n and e are integers greater than 1, such that the host controller supports a total of t potential universal serial bus endpoints, where t is n multiplied by e and thus an integer greater than 3, establishing x endpoint state machines, where x is an integer greater than 1 and less than t;
maintaining, at the host controller, a two-dimensional endpoint scoreboard having n by e entries, wherein each entry includes both: (i) an indication of an endpoint type, and (ii) a pending work item indication;
based on information in the two-dimensional endpoint scoreboard, assigning a first endpoint state machine at the host controller to a first potential endpoint having a pending work item; and
before the host controller has completed the pending work item associated with the first potential endpoint, flushing by the host controller the first endpoint state machine and assigning the first endpoint state machine to a second potential endpoint.

2. The method of claim 1, wherein the host controller includes scheduler, and further comprising:
assigning, by the scheduler, endpoint state machines to potential endpoints having pending work items in accordance with the two-dimensional endpoint scoreboard.

3. The method of claim 2, wherein the host controller is coupled to a host memory that includes an endpoint context base address array.

4. The method of claim 3, wherein the endpoint context base address array supports an endpoint context for each of the x endpoint state machines.

5. The method of claim 4, wherein each endpoint context may be associated with at least one work item and associated data.

6. The method of claim 5, wherein a work item may represent: (i) data to be transferred out of the host controller, or (ii) data to be transferred into the host controller.

7. The method of claim 5, wherein a work item may represent: (i) a periodic work item, (ii) an isochronous work item, (iii) an interrupt work item, (iv) an asynchronous work item, (v) a control work item, or (vi) a bulk work item.

8. The method of claim 2, wherein said assigning is performed in accordance with a minimum service interval.

9. An apparatus, comprising:
a host controller capable of exchanging information with n universal serial bus devices, each device supporting up to e potential endpoints, where n and e are integers greater than 1, such that the host controller supports a total of t potential universal serial bus endpoints, where t is n multiplied by e and thus an integer greater than 3, including:
a plurality of endpoint state machines,
a scheduler storing information about universal serial bus devices and associated potential endpoints, and
a two-dimensional endpoint scoreboard having n by e entries, wherein each entry includes both: (i) an indication of an endpoint type, and (ii) an indication of whether or not that potential endpoint currently has an available work item,
wherein the scheduler is to multiplex a single endpoint state machine for a plurality of endpoints having available work items based on information in the two-dimensional endpoint scoreboard, and further wherein the host controller is to (i) assign a first endpoint state machine to a first potential endpoint having a pending work item based on information in the two-dimensional endpoint scoreboard, and (ii) flush the first endpoint state machine, before the host controller has completed the pending work item associated with the first potential endpoint, and assign the first endpoint state machine to a second potential endpoint; and
a host memory, including:
an endpoint context base address array, and
a plurality of endpoint context structures, each endpoint context structure being able to be associated with a work item and associated data.

10. The apparatus of claim 9, wherein a work item may represent: (i) data to be transferred out of the apparatus, or (ii) data to be transferred into the apparatus.

11. The apparatus of claim 9, wherein a work item may represent: (i) a periodic work item, (ii) an isochronous work item, (iii) an interrupt work item, (iv) an asynchronous work item, (v) a control work item, or (vi) a bulk work item.

* * * * *